Patented Oct. 24, 1933

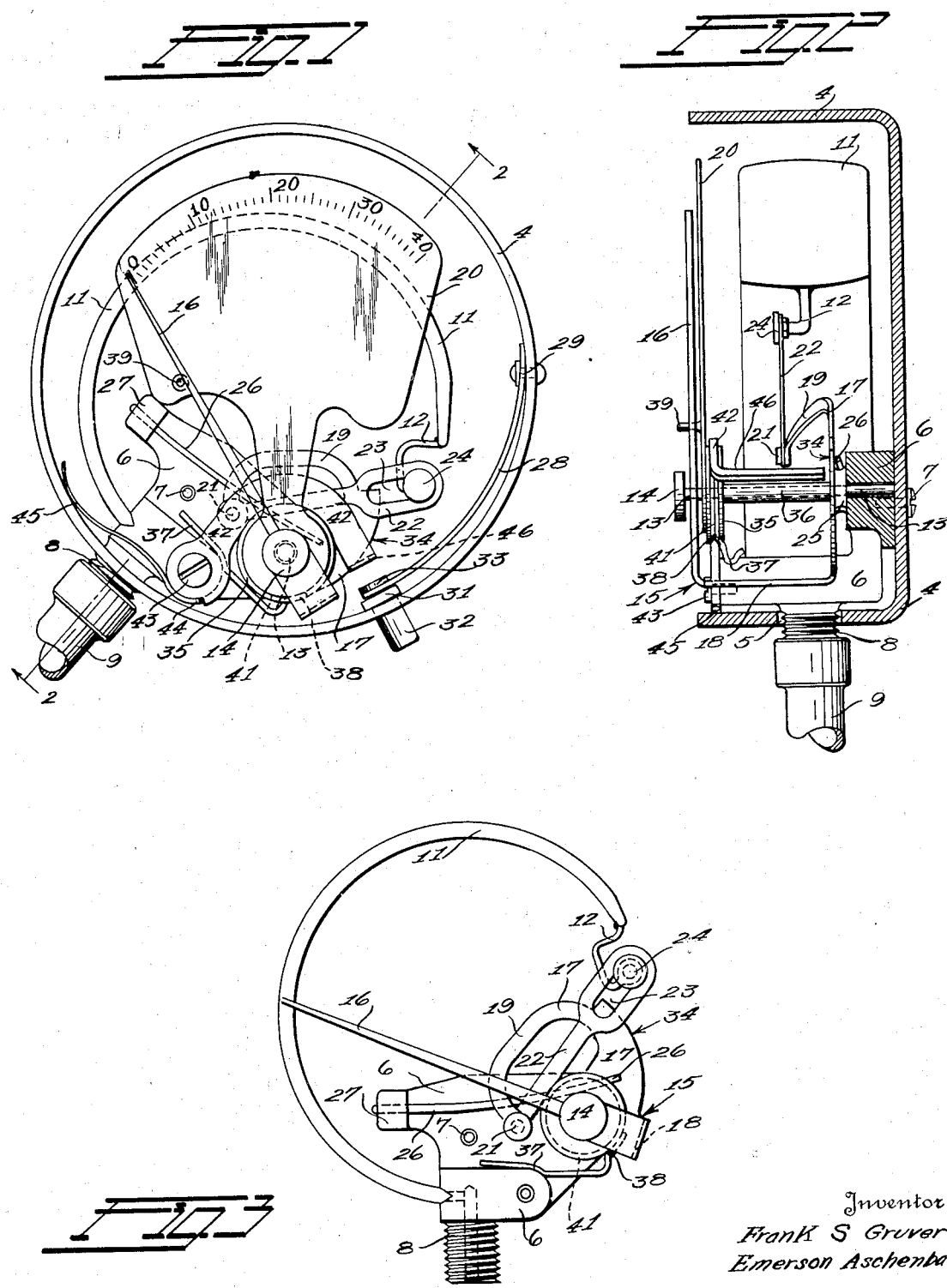

1,932,159

UNITED STATES PATENT OFFICE 1,932,159

GAUGE

Frank S. Gruver and Emerson Aschenbach, Sellersville, Pa., assignors to United States Gauge Company, New York, N. Y., a corporation of Pennsylvania Application October 1, 1930. Serial No. 485,751

16 Claims. (Cl. 73—109)

This invention relates to gauges, particularly pressure gauges of the type embodying a pressure-responsive device, hereinafter also referred to as the primary flexing member, for actuating an indicator that cooperates with a dial or the like to register pressures. The term "pressures" is, of course, here used to denote negative or absolute pressures as well as those above atmospheric.

In pressure gauges of the type above described, the parts of the operating mechanism often undergo such changes, through wear and distortion and the like, as to render inaccurate readings. The most common defect in gauges now in use is that the pointer and dial get out of calibration, so that the pointer does not align itself with the initial or zero mark on the dial when it should, and hence gives inaccurate readings for all positions of the pointer. It has been proposed to remedy this defect by providing manual adjustments for the pointer and even for the dial. These adjustments, however, are inconveniently made by shifting an element to some selected fixed position and must be made so often as to cause annoyance, and often are overlooked either through ignorance, indifference or carelessness.

Accordingly it is a primary object of the present invention to provide a gauge the indicating mechanism of which may be brought into proper calibration merely by shifting a conveniently disposed movable means that is associated with the indicating mechanism. In this connection it is a major object of our invention to design a gauge in such manner that a correction of the inaccuracies, if any, is accomplished automatically each time that the gauge is operated to record a reading.

Several more specific objects, subordinate to the above ultimate objects, are, in a gauge having a dial and a pointer, to cause a continued and definite calibrated alignment of the pointer and the initial point of the dial; to provide a shiftable dial which is operated automatically, as the pointer returns toward "zero" position, to assume a set position accurately corresponding with that of the pointer; to provide a shiftable dial having a fixed point thereon, as a stop pin, to meet the pointer as the latter returns to its initial position, and having a brake or lock to hold the dial after its stop pin has engaged the pointer and has assumed an accurate initial position; and to provide a movement which is peculiarly adapted to serve in combination with the features just outlined.

Further objects will appear from the following detailed description and the accompanying drawing, wherein:

Figure 1 is a face view, with the cover removed and the mechanism in zero position, of one type of gauge embodying a preferred form of our invention.

Figure 2 is a view, in partial section, taken on the plane of line 2—2 in Figure 1, with the mechanism shown in elevation and in extended position for the measurement of high pressure.

Figure 3 is a face view of the mechanism of Figure 1 removed from the casing and with the dial and its brake detached for clarity of illustration.

The particular device illustrated in the drawing is especially designed for use where readings are to be taken at intervals and the pointer to be reset to zero position after each reading, as when measuring the pressure in pneumatic tires. It will be understood that the principles of this invention are readily applicable to many other types of gauges, with and without modification.

With continued reference to the drawing, wherein like numerals are employed to designate like parts, the numeral 4 indicates a cup-shaped casing having a hole 5 in its annular wall. A mounting block 6, disposed within the casing and secured firmly against the back wall of the latter by a screw 7, has an integral threaded extension 8 projecting through the hole 5 to receive a conduit 9 adapted to communicate with a pressure source. A Bourdon tube 11 has one end anchored in the block 6 in conventional manner to be subjected to the pressure fluid admitted through the conduit 9 and the extension 8. The free or closed end of the tube has a bent actuator 12 soldered or otherwise secured thereto. Expansion of the tube in response to pressure fluctuations is utilized to indicate pressures by way of the following mechanism:

A pin 13, having a head 14, is driven or otherwise firmly set into the mounting block 6. Upon this pin there is oscillatably pivoted a substantially U-shaped device 15 comprising a pointer 16 pivoted adjacent the pin head, an actuated arm 17 pivoted adjacent the block 6, and a bar 18 integrally interconnecting the pointer and the actuated arm 17. The latter has an offset actuated finger 19 bent over toward the pointer, the end of this finger being pivotally connected, as at 21, to one end of an actuated link 22. The opposite end of link 22 is enlarged and has a longitudinal closed slot 23 therein for slidably receiving a pin 24 that projects into the tube-carried actuator 12. It will thus be seen that, as the Bourdon tube expands, it lifts the slotted end of the link and causes the latter to swing the device 15 and its pointer 16 in a clockwise direction.

The purpose of the slot 23 is to permit the tube to return to contracted position without moving the pointer from its position of indicated pressures. A dial 20, marked as shown for cooperation with the pointer, is mounted upon the pin 13. The pointer is steadied, and maintained in indicating position after the release of operating pressure, by means comprising a drum 25 rigidly soldered or otherwise secured to the rear face of the arm 17 and freely surrounding the pin 13, and further comprising a wire spring 26 having one end set into a lug 27 on the block 6 and its other end frictionally bearing against the periphery of the drum. Means is provided for conveniently resetting the pointer to its initial or zero position after each pressure indication, as follows:

A flat spring 28 (see Fig. 1) has one end riveted, as at 29, upon the inner wall of the casing 4 in such manner that its other end terminates adjacent the arm 17 of the device 15. The last mentioned end resiliently bears against an enlargement 31 of a plunger 32 that is reciprocable through the wall of the casing. The spring carries a button 33 designed, when one presses inwardly upon the plunger with his thumb to overcome the resistance of the spring, to bear against a camming surface 34 formed on the arm 17. Continued thumb pressure causes the cam to slide past the button until the pointer is oscillated to its zero position.

The dial 20 is not fixed upon the pin 13, but is secured to a brake drum 35 which, together with an integral sleeve 36, is freely pivoted upon the pin 13. A light wire spring 37 has one end soldered to the drum 35, as at 38, and has its other end reacting against the block 6 in such manner as to tend to oscillate the drum and dial in a clockwise direction. This spring action must not be sufficiently strong, when a stop element 39 on the dial engages the pointer, to overcome the braking resistance of the wire spring 26. The reason for this will become apparent later. A braking or locking device for the dial is provided, as follows:

The brake drum 35, to which the dial is secured, has a peripheral groove 41 on its surface, into a portion of which groove there fits the inner edge of a curved braking arm 42. One end of the braking arm is pivoted on the block 6 by a screw 43 and to this end of the arm there is soldered or otherwise secured at 44 a curved wire spring 45 which reacts against the casing 4 in such manner as to swing the arm in a clockwise direction against the brake drum 35. This serves to lock the dial in zero position, but means is provided for releasing it during the pointer resetting operation.

This means comprises a brake-release finger 46 that is integrally formed with the brake arm and projects laterally therefrom into proximity to the camming surface 34 and the push button 33. When the latter is thrust inwardly during the return movement of the pointer it first engages the cam 34 and then, substantially at the moment that the pointer arrives at its zero position, the button engages the release finger to disengage the brake arm from the drum groove 41. Further inward movement of the button causes the pointer to engage the stop pin on the dial and carry the released dial with it in a counterclockwise direction. This "further" movement of course took place against the resistance of the Bourdon tube, the latter having been contracted slightly from its natural or free zero position. Hence, when the push button is released the first thing that occurs is a slight expansion of the tube to its natural or free position which, of course, is the true and accurate zero position. During such tube expansion the pointer is drawn, by way of the actuator 12, link 22, finger 19 and arm 17 into a corresponding true and accurate zero position. Due to the action of the steadying wire 26 that engages the drum 25, the pointer will not pass the point to which it is positively drawn by the expanding Bourdon tube.

The next event that takes place (substantially simultaneous with the pointer movement just described) is the clockwise rotation of the dial in response to the action of its light spring 37. The dial rotates until its stop pin 39 engages the pointer and it is then brought to a stop because the spring 37 cannot overcome the braking resistance of the wire 26. Substantially at the same moment the brake arm 42 is permitted to come into engagement with the dial drum 35 and lock the dial in position. Both the pointer and dial are now in alignment in their true zero position (corresponding to the exact natural zero position of the Bourdon tube) and the gauge is ready to be pressed upon a tire valve or the like to take a pressure reading.

Although a number of individual steps or operations have been described above it will be understood that the resetting is practically instantaneous, since all one has to do is to depress and then release the plunger 32. The indicating mechanism always is maintained automatically in correct position and relationship, so that no additional calibrating means or adjustments are necessary. The "zero" position frequently referred to is, of course, any initial or predetermined position. A diaphragm or the like may be substituted for the Bourdon tube, and the invention may be embodied in gauges other than positive pressure gauges. If desired, the thumb manipulated device may be abolished and the connection between the Bourdon tube and the mechanism be so modified that contraction of the tube will automatically operate during the resetting of the pointer to actuate the release finger 46 in a manner similar to that above described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:

1. In a gauge having an indicating mechanism designed to be returned to an initial position after each reading, means for actuating said mechanism to indicate a measurement value, means for resetting said mechanism to its initial position, and means for automatically making a correct adjustment of the indicating mechanism when the latter is returned to its initial position by said resetting means.

2. In a gauge, an indicating mechanism, means for actuating said indicating mechanism, means for automatically maintaining the indicating mechanism in correct calibration or adjustment during the normal operation of the gauge, and a manually operable device conveniently manipulated from without the gauge, said automatic means being operable in response to manipulation of said device.

3. In a gauge construction, an indicating mechanism comprising a dial and a pointer or the like cooperating therewith, means for actuating said indicating mechanism, and means automatically maintaining the indicating mechanism in correct adjustment during operation of the gauge, said automatic means comprising a device for aligning said pointer with its correct position on said dial when the indicating mechanism is actuated in one of its directions of movement.

4. In a gauge having an indicating mechanism designed to be returned to an initial position after each reading, means for actuating said mechanism to indicate a measurement value, means for automatically making a correct adjustment of the indicating mechanism when the latter is returned to its initial position, said indicating-mechanism comprising a dial and a pointer, and a manually operable device for returning said mechanism to initial position and rendering said automatic means operative to align the pointer with its correct initial position on the dial.

5. A gauge comprising a pressure-responsive element, an indicating mechanism actuated by said element to render visible pressure readings, and means for automatically maintaining said indicating mechanism in accurately adjusted relationship to said pressure-responsive means to indicate true positions of the latter during normal operation of the gauge.

6. In a gauge having an indicating mechanism designed to be returned to an initial position after it has registered a pressure indication, a pressure-responsive element for actuating said mechanism to indicate a pressure value, and means for making any necessary corrective adjustment of the indicating mechanism, said means being automatically operable in response to return movement of said mechanism to its initial position.

7. In a gauge construction, a shiftable dial, an indicator cooperating with said dial to render visible readings, means for operating said indicator, means for normally holding said dial in fixed position, means for releasing said holding means, and means, operable when said holding means is released, for shfting said dial into correct position relative to said indicator.

8. In the combination defined in claim 7, said holding means comprising a yielding friction brake.

9. In the combination set forth in claim 7, said holding means comprising a member mounted for unitary movement with said dial and an element yieldingly pressed into engagement with said member.

10. In the combination specified in claim 7, said releasing means comprising a manually operable device for resetting said indicator and substantially simultaneously releasing said holding means.

11. In the combination of claim 7, means for frictionally resisting movement of said indicator, and said shifting means comprising a resilient device for urging said dial in the direction of the indicating movement of the indicator.

12. In the combination defined in claim 7, said indicator comprising a pointer, said dial having a stop device for engaging the pointer upon return movement of the latter to its initial position, and said dial shifting means comprising a resilient device for actuating the dial to urge said stop device toward said pointer when said holding means is released.

13. In a gauge construction, a dial and a pointer pivoted for oscillation about a common axis, mechanism for actuating said pointer to render visible indications, means for resetting the pointer after each indication, and means for oscillating said dial during the pointer resetting operation to bring an initial position on said dial into exact alignment with a portion of the pointer.

14. In the construction defined in claim 13, said last-mentioned means comprising means for urging the dial in the direction of pointer indication, means constantly resisting pointer oscillation, means for normally locking said dial against oscillation by said urging means, and means for temporarily releasing said locking means when the pointer is reset to its initial position.

15. In a pressure gauge in combination, a dial and an indicator, mechanism for actuating said indicator in one direction to cause it to render pressure indications on the dial, pressure-responsive means connected with said actuating means to operate the latter, means for retaining said indicator in its indicating position after the pressure has decreased in said pressure-responsive means, means for resetting said indicator to its initial position after the pressure reading has been taken, and means automatically operable, upon movement of said resetting means, to adjust said pointer and dial into proper relationship to indicate an initial pressure condition at the exact moment that said presure-responsive means is in its initial position.

16. In the combination defined in claim 15, said pressure-responsive means comprising a Bourdon tube having a connection at its free end with said actuating mechanism, said connection being designed to permit said free end to return to initial position without a corresponding movement of the indicator, and said resetting means comprising a cam carried by said indicator and a manually operable device designed to be thrust into engagement with said cam and said automatically operable means.

FRANK S. GRUVER.
EMERSON ASCHENBACH.